US010645887B2

(12) United States Patent
English

(10) Patent No.: US 10,645,887 B2
(45) Date of Patent: May 12, 2020

(54) VERTICAL HYDROPONIC GROW CONTAINER

(71) Applicant: Anthony D. English, Littleton, CO (US)

(72) Inventor: Anthony D. English, Littleton, CO (US)

( * ) Notice: Subject to any disclaimer, the term of this patent is extended or adjusted under 35 U.S.C. 154(b) by 260 days.

(21) Appl. No.: 15/957,606

(22) Filed: Apr. 19, 2018

(65) Prior Publication Data

US 2019/0320606 A1 Oct. 24, 2019

(51) Int. Cl.
| | |
|---|---|
| *A01G 31/04* | (2006.01) |
| *A01G 31/06* | (2006.01) |
| A01G 31/00 | (2018.01) |
| A01G 29/00 | (2006.01) |

(52) U.S. Cl.
CPC .............. *A01G 31/06* (2013.01); *A01G 29/00* (2013.01); *A01G 2031/006* (2013.01)

(58) Field of Classification Search
CPC ...... A01G 31/06; A01G 9/023; A01G 31/045; A01G 31/042
See application file for complete search history.

(56) References Cited

U.S. PATENT DOCUMENTS

| | | | | |
|---|---|---|---|---|
| 3,931,695 A * | 1/1976 | Widmayer | ............. | A01G 7/045 47/59 R |
| 6,021,602 A * | 2/2000 | Orsi | ....................... | A01G 31/02 47/62 A |
| 8,327,582 B2 * | 12/2012 | Storey | ..................... | A01G 31/02 47/62 R |
| 9,241,453 B1 | 1/2016 | Martin | | |
| 2003/0223850 A1 * | 12/2003 | Hendriks | ............... | A01G 9/143 414/626 |
| 2004/0201988 A1 * | 10/2004 | Allen | ..................... | H05B 45/00 362/249.01 |
| 2005/0281027 A1 * | 12/2005 | Capen | .................... | A01G 7/045 362/231 |
| 2006/0156624 A1 * | 7/2006 | Roy | ....................... | A01G 31/02 47/62 R |

(Continued)

OTHER PUBLICATIONS https://www.freightfarms.com/home Freight Farms Published Mar. 6, 2018.

*Primary Examiner* — Monica L Williams
(74) *Attorney, Agent, or Firm* — Patent Law Offices of Rick Martin, P.C.

(57) ABSTRACT

A shipping container is fitted to house a vertical hydroponic grow system. The entrance allows wheelchair access. The floor is a skid proof flat and dry design. The ceiling has four side to side rails that can support multiple grow frame movable walls and four movable LED light walls. Each grow frame wall has a plurality of vertically hanging (plastic) grow tubes each with front and rear plant ports. The grow frame walls can be moved to allow wheelchair access for harvesting and replanting without removal of the grow tubes. Each grow frame wall has an integral lower gutter that empties into a catch basin preferably located at an end of the container opposite the entrance. A nutrient reservoir recirculates the nutrient fluid to each grow frame wall on a programmed interval. Ozone and a R/O filter cycle cleans the nutrient fluid on a selected cycle. A seed station can be located at the entrance.

14 Claims, 20 Drawing Sheets

(56) References Cited

U.S. PATENT DOCUMENTS

| | | | |
|---|---|---|---|
| 2010/0024292 A1* | 2/2010 | Kertz | A01G 9/024 47/17 |
| 2010/0134025 A1* | 6/2010 | Link | H05B 45/00 315/185 R |
| 2014/0000162 A1* | 1/2014 | Blank | A01G 31/06 47/62 A |
| 2014/0020292 A1 | 1/2014 | McNamara | |
| 2014/0115958 A1 | 5/2014 | Helene | |
| 2018/0000029 A1 | 1/2018 | Martin | |

* cited by examiner

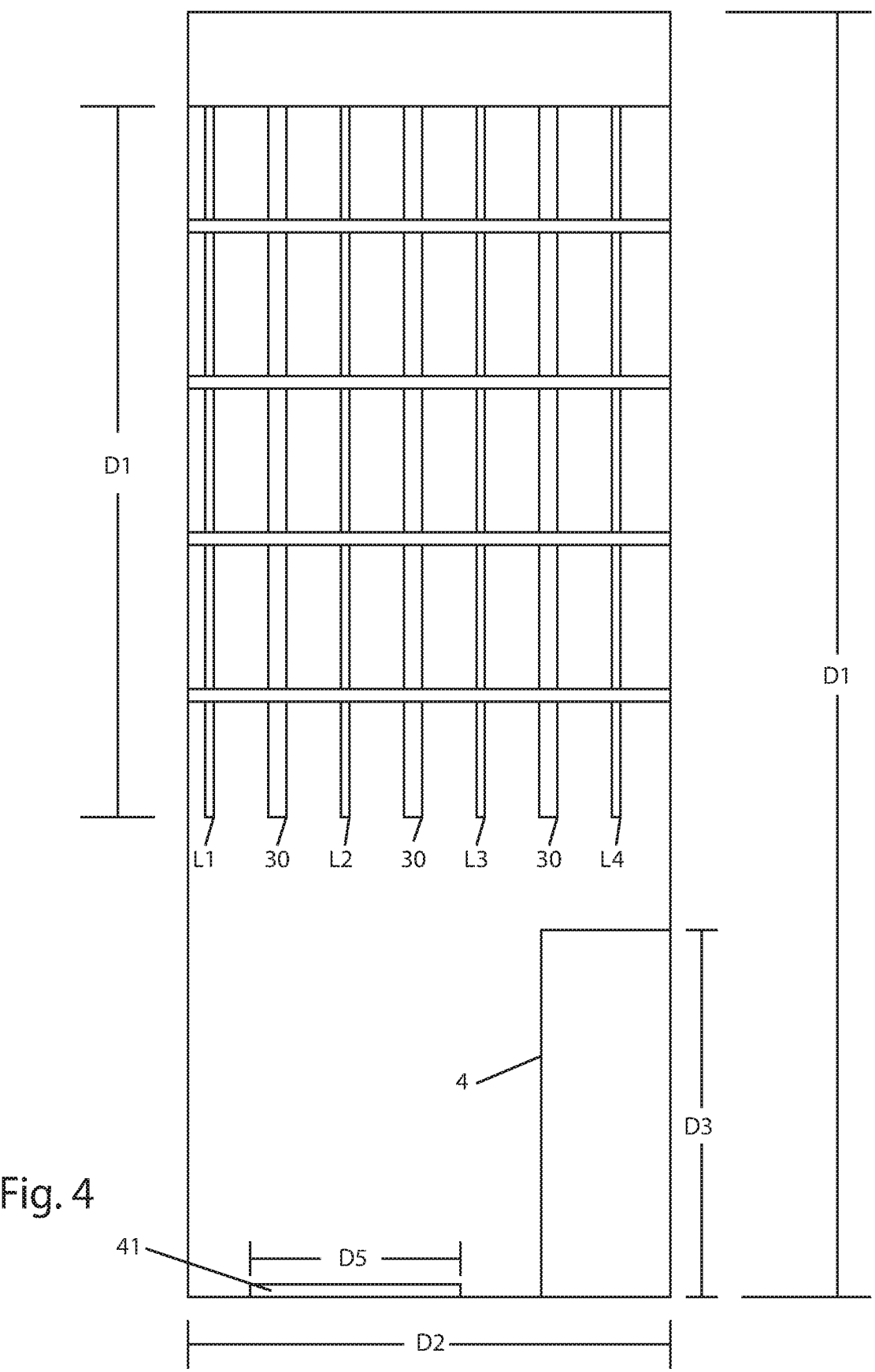

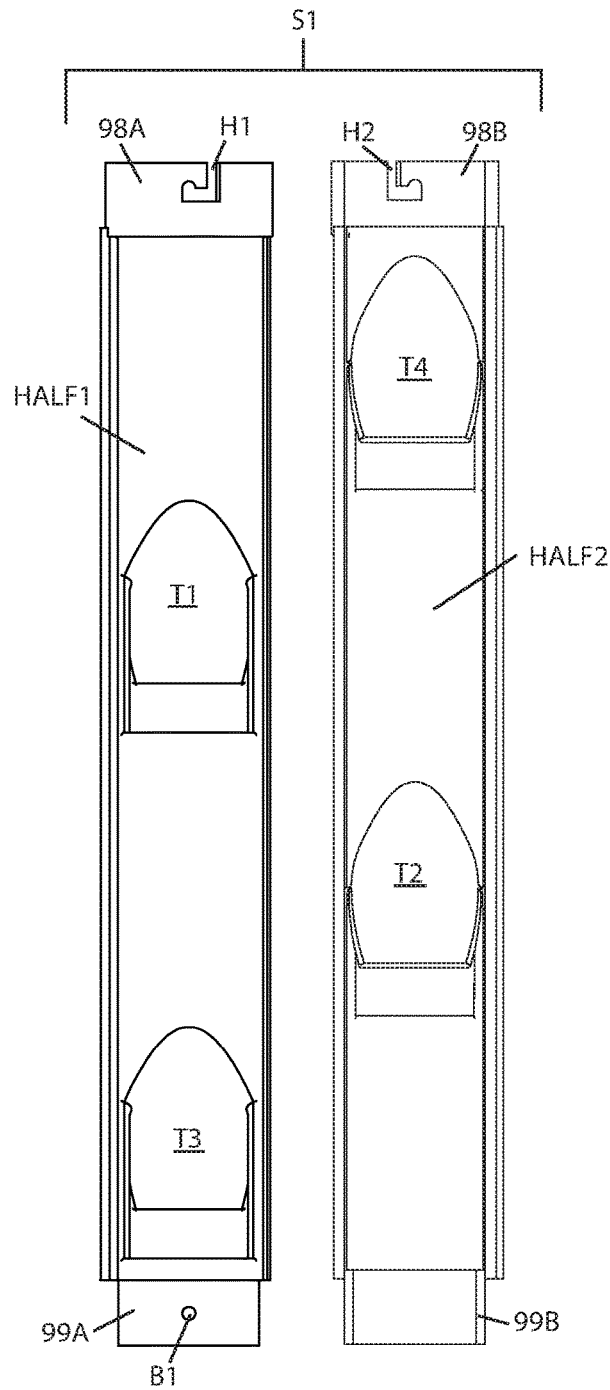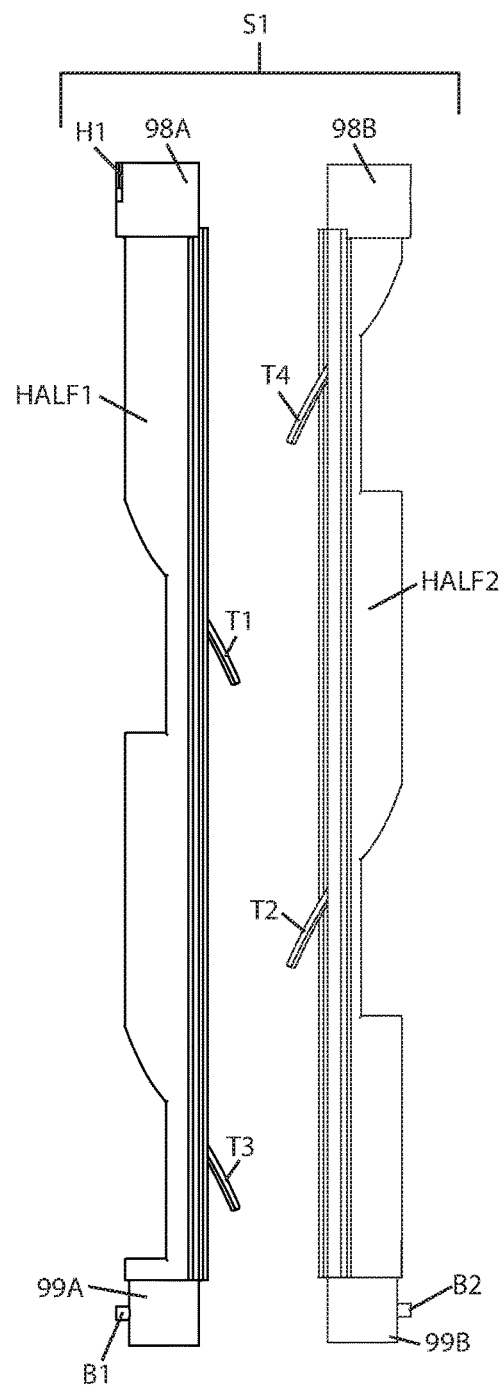
Fig. 23
Fig. 24

VERTICAL HYDROPONIC GROW CONTAINER

FIELD OF INVENTION

The present invention relates to providing a tractor trailer container type enclosure having a plurality of hanging frames with hydroponic tubes supporting plants on both sides of each frame.

BACKGROUND OF THE INVENTION

Pub. No. US 2018/0000029 discloses a grow panel enclosure having a frame suited to hang from a ceiling of a container grow enclosure. See U.S. Pat. No. 9,241,453 for a sample container grow enclosure. The '029 frame has a front and a rear panel each having a plurality of plug holder openings to support a root ball of a plant. Between the grow panels is mounted a plurality of vertical nutrient pipes that have spray nozzles numbered 70, as shown in FIG. 18. This type of nutrient application is called aeroponic, the nutrients and water coming from an airborne mist. These frames can be ceiling mounted on roller bearings and guides so as to be moved side-to-side and front-to-back. See '453 col. 7 lines 12-34. There is provided a seed sprouting station, see '453 FIG. 6 number 84.

Pub. No. US 2014/0020292 discloses a container grow system with hydroponic vertical racks that have a one sided root ball mesh support. Each rack is taken down for harvesting and replanting, see para. 0040. The high flow rate of recirculating nutrients minimizes any algae or bacteria growth. Also the constant exposure of the roots to flowing water, as in horizontal trays, is eliminated which prevents rot, see para 0041.

What is needed in the art is a true hydroponic grow enclosure that minimizes airborne nutrients that can harm the operator. A side to side moving frame system with an integral moving gutter and nutrient feed system is needed. A vertical grow tube with front and rear access for harvesting/replanting without removing the grow tube is needed. The present invention provides all these needed features and more.

SUMMARY OF THE INVENTION

The main aspect of the present invention is to provide a container style grow enclosure for hydroponic grow tubes.

Another aspect of the present invention is to provide side to side ceiling mounted grow frames to enable work spacing between sliding frames large enough for a wheelchair.

Another aspect of the present invention is to provide a sliding frame wall with an integral gutter feeding a catch basin, thereby maintaining a dry floor.

Another aspect of the present invention is to provide a sliding frame wall with an integral gutter feeding a catch basin, thereby maintaining a dry floor.

Another aspect of the present invention is to provide a sump pump from the each basin to a nutrient reservoir.

Another aspect of the present invention is to provide an ozone and reverse osmosis (R/O) cleaning loop for the nutrient reservoir.

Another aspect of the present invention is to provide a front and back access grow tube array in each grow frame, thereby enabling harvesting and replanting without removal of the grow tube.

Another aspect of the present invention is to provide a seed sprouting station having its own R/O filter system.

Another aspect of the present invention is to provide a nutrient feed manifold to individually water each grow frame wall.

Another aspect of the present invention is to provide a programmable central processor to control timing of grow frame wall watering and cleaning and nutrient reservoir cleaning cycles.

Another aspect of the present invention is to provide a modular grow tube with internal baffles to direct a water flow, support root balls and have front and rear root ball ports.

Another aspect of the present invention is to provide an operator safety environmental control system including air humidity control, electrical low trip circular breakers, smoke alarm, and motion detection.

Other aspects of this invention will appear from the following description and appended claims, reference being made to the accompanying drawings forming a part of this specification wherein like reference characters designate corresponding parts in the several views.

In operation a container is fitted with an aluminum non-skid flat floor. City water passes through a multi-valve arrangement to provide garden hose flow, seed station flow and nutrient grow reservoir flow. Ceiling mounted side-to-side tracks support (three) grow frame walls and (four) lighting frame walls. Each grow frame wall has an integral overheard pipe to supply (57) hanging grow tubes. Each grow frame wall receives about ten gallons an hour of conditioned water. A gutter is integral with the lower frame of each wall. The gutter for each wall empties via gravity into a catch basin at the end of the container. A sump pump moves the water up into the (150 gallon) nutrient reservoir.

Valves (manual or computer controlled) add nutrients to the receiver at a predetermined mixing cycle and then to each grow wall. A cleaning cycle recirculates the nutrient reservoir in a closed loop through an R/O filter and an ozone injector. All nutrient flow to the walls is shut off during the periodic cleaning cycles to prevent any ozone from reaching the plants.

A known nutrient ph and mixture system treats the nutrient reservoir.

Each hanging tube comprises a plurality of connected tubes, each with a front and a rear plant port. A baffle for each plant port supports the plant and allows the nutrient fluid to flow through each plant and into the gutter.

A front of the container has a seed station with a self-contained R/O nutrient reservoir, lighting and horizontal trays. A central computer has a custom program to vary selected nutrient and cleaning cycles. Operator safety systems include air-circulation and monitoring, smoke alarms, air conditioning and cleaning and a motion detector.

BRIEF DESCRIPTION OF THE DRAWINGS

FIG. 4 is a top plan view of the container with the grow system of FIG. 3 therein.

FIG. 23 is a front elevation exploded view of tube segment S1 shown in FIG. 22.

FIG. 24 is a right side elevation exploded view of tube segment S1 shown in FIG. 23.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
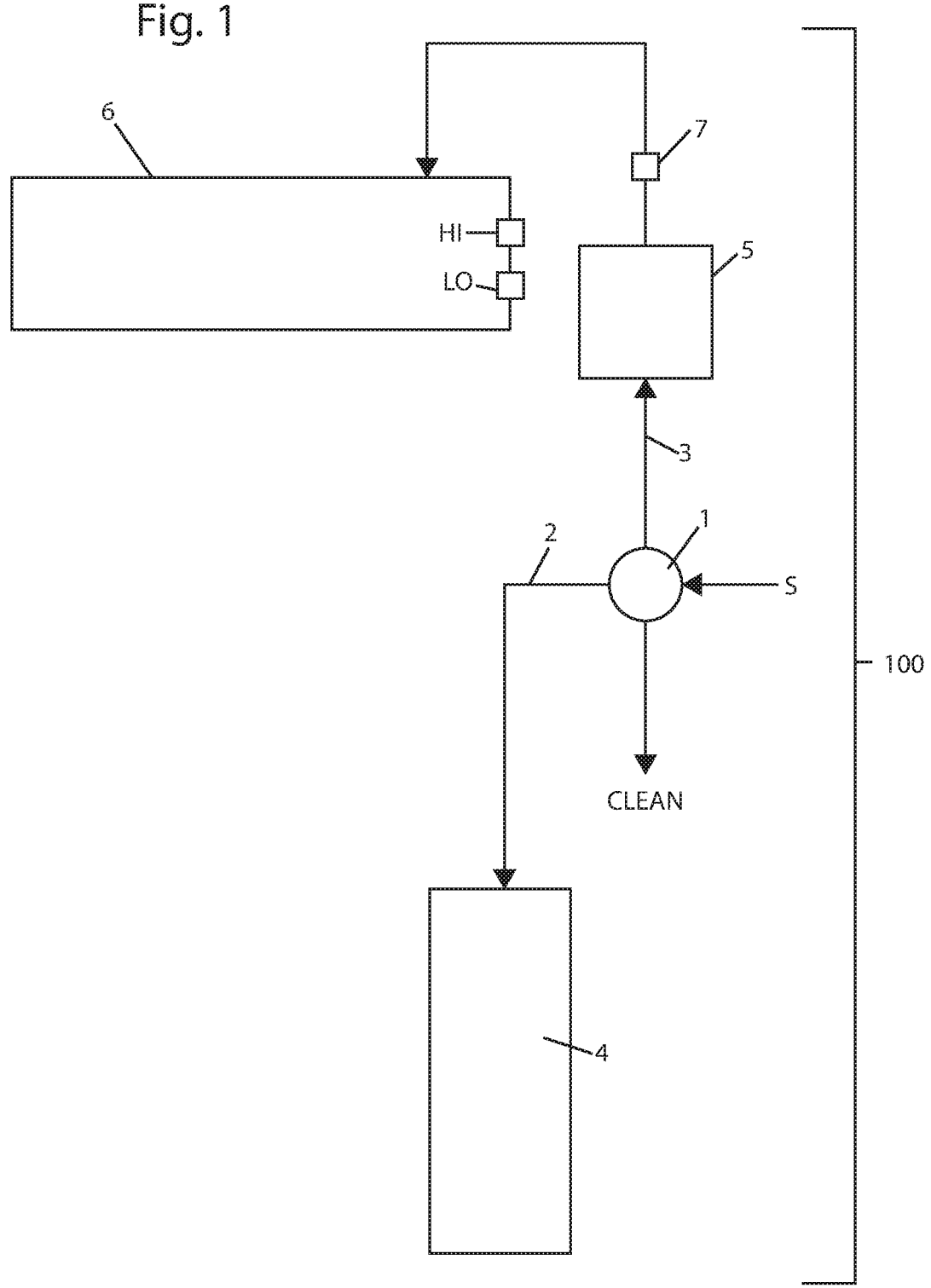
FIG. 1 is a schematic overview of the container grow system.
Figure 2:
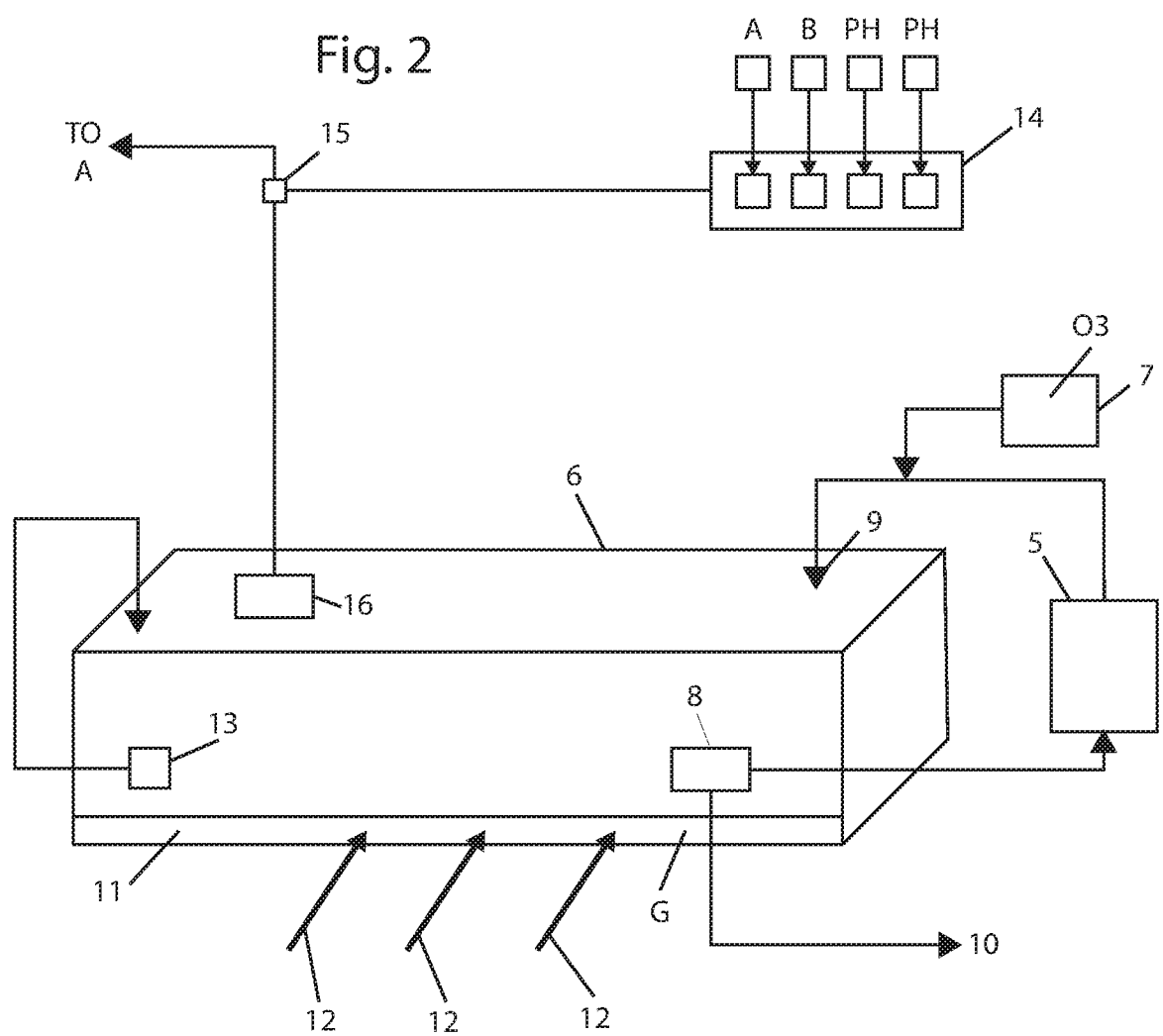
FIG. 2 is a schematic overview of the nutrient circulation system.

Referring first to FIG. 1 the overall grow system is designated 100. City water 5 enters the container into a service manifold 1. A first garden hose type port CLEAN is used for general cleaning. A second port 2 supplies water to a seed station 4, nominally located adjacent the entry way. A third port 3 supplies water to an R/O filter 5 and then to the main reservoir 6. An $O_3$ injector is labeled 7. High Hi and low Lo level switches can be used to add water from pipe 30. Referring next to FIG. 2 a closed loop R/O filter is periodically run by starting pump 8 which feeds the R/O filter 5 and then returns the filtered reservoir water at 9. The $O_3$ injector (nominally venturi type) can share the same piping at 9. The pump 8 can have a valve to empty the reservoir at 10. A catch basin 11 catches the excess nutrient fluids 12 that fall from the plurality of grow tubes 30 shown in FIG. 3. Catch basin 11 may extend out about six inches from reservoir 6. A pump 13 pumps out the catch basin 11 to return the nutrient fluids to the reservoir 6 (150 gallon nominally). A prior art chemical balance system 14 can balance PH and chosen chemicals A and B. A sensor 15 can trigger the chemical balance system 14 to add chemicals. A main circulation pump 16 sends nutrient fluids from the reservoir 6 to selected grow walls 30 shown in FIG. 3.

Figure 3:
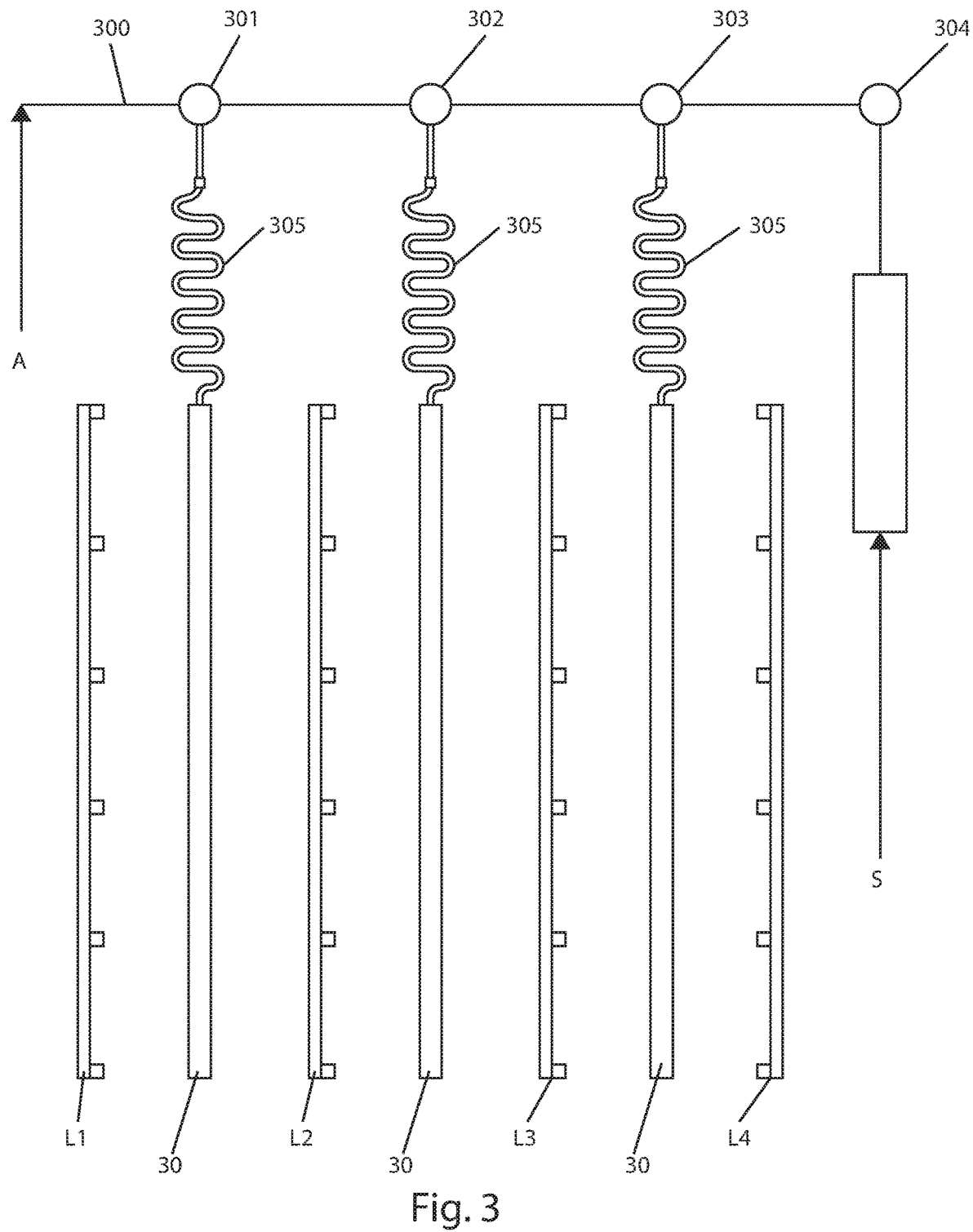
FIG. 3 is a top plan view of a three grow wall and four light wall container grow system.

Referring next to FIG. 3 a main supply manifold 300 is fed by pump 16 shown in FIG. 2 Valves 301, 302, 303 are open and closed by a central computer for timed nutrient feedings. A manually operated series of valves could work too. If sensor 304 senses an R/O cleaning loop using pump 8 of FIG. 2, then all three valves 301, 302, 303 are closed to prevent any $O_3$ contamination of the plants. A typical cleaning cycle is ten minutes every 24 to 48 hours. The light panels L1, L2, L3 as well as the grow tubes 30 are ceiling mounted on side to side tracks of the type used to support hanging doors. Flexible pipe segments 305 allow the grow tubes to receive nutrient fluids anywhere along the ceiling tracks.

Not shown are flexible electrical cables for the light panels L1, L2, L3, L4.

Referring next to FIG. 4 a typical container 40 has dimensions D1=40', D2=8', D3=12', D4=24'. An entrance 44 has a wheelchair width D5=3'.

Figure 5A:
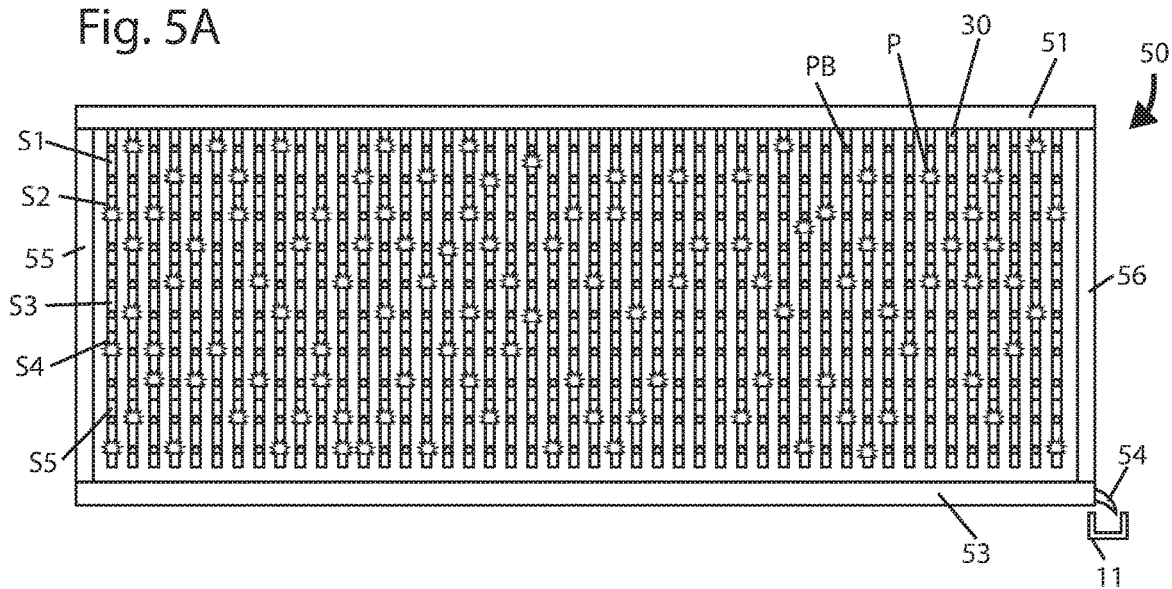
FIG. 5A is a side elevation view of a grow wall.
Figure 6:
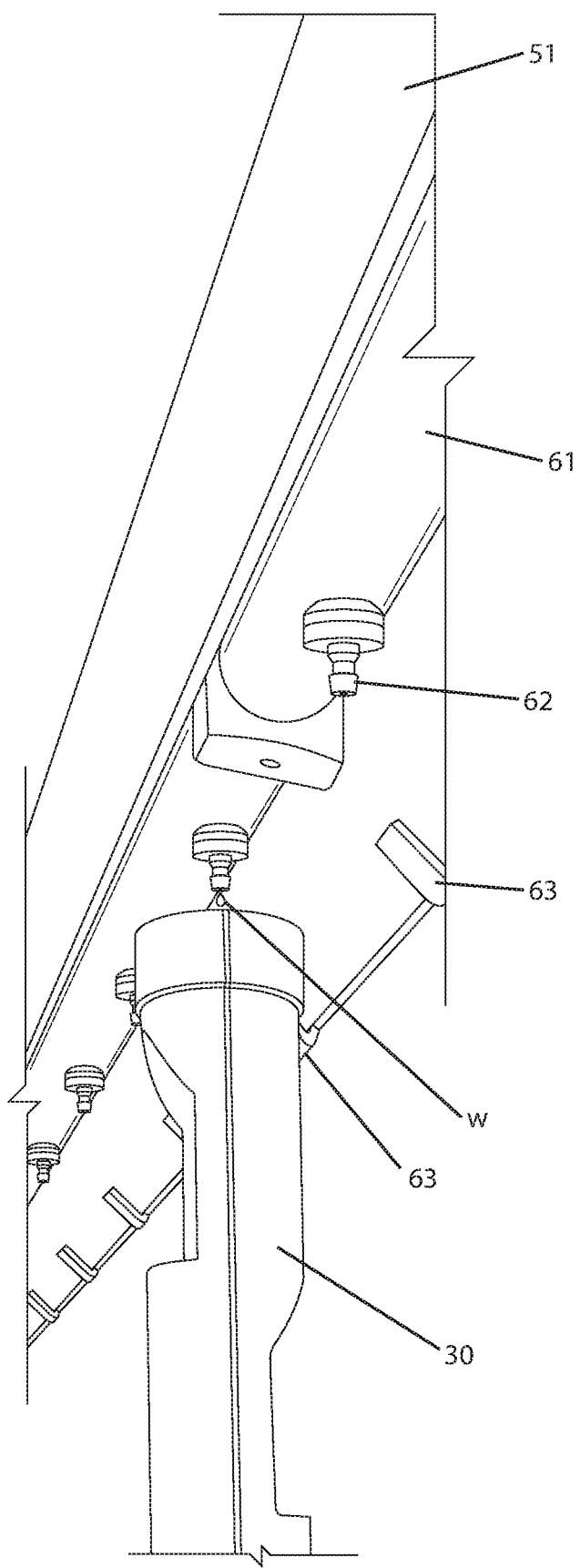
FIG. 6 is a bottom perspective close up view of a top of a vertical grow tube.

Referring next to FIG. 5A a grow wall 50 has a top brace 51 that holds a nutrient pipe 61 as shown in FIG. 6. Vertical frame members 55, 56 support the lower gutter 53. Nominally 46 grow tubes 30 hang from the top brace 51. Each grow tube 30 consists of five tube segments S1-S5. A plant P with roots can be placed in each plant basin PB. Excess nutrient fluid falls out the bottom of each grow tube 30 and into the lower gutter 53 and then through spout 54 into the gutter 11 shown in FIG. 2.

Figure 5B:
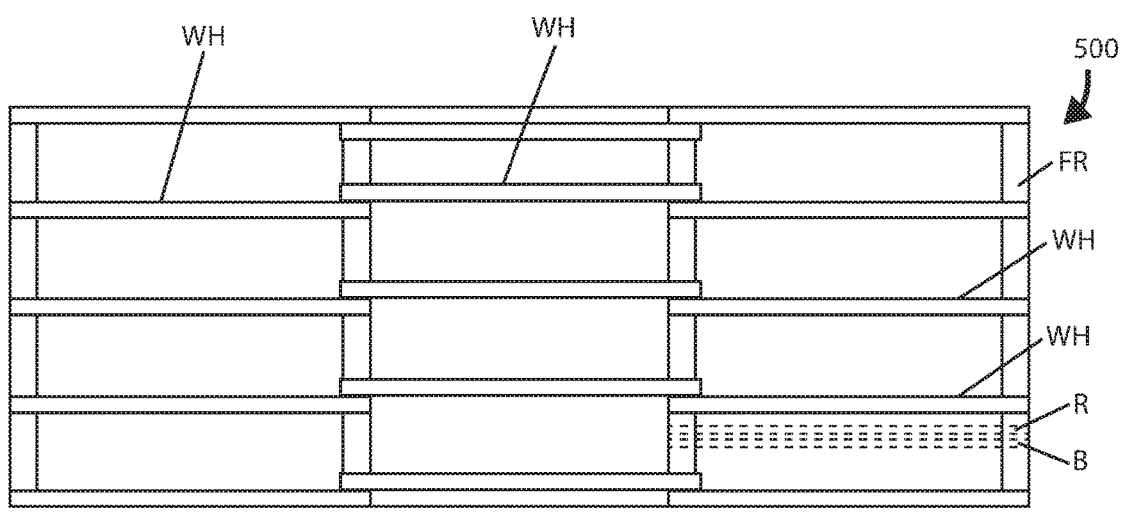
FIG. 5B is a side elevation view of a light wall.

Referring next to FIG. 5B one of four light panels is labeled 500. A frame FR supports horizontal white lights (preferably LED's) WH. Optionally frequency enhancing red LED strips R and blue LED strips B can be added to any white light WH. The red R and blue B strips could be independently wired with or without a timing circuit.

Referring next to FIG. 6 the top brace 51 has a nutrient pipe 61 with a drip nozzle 62 for each grow tube 30 to allow nutrient fluid W to fall into the top of each grow tube 30.

Figure 7:
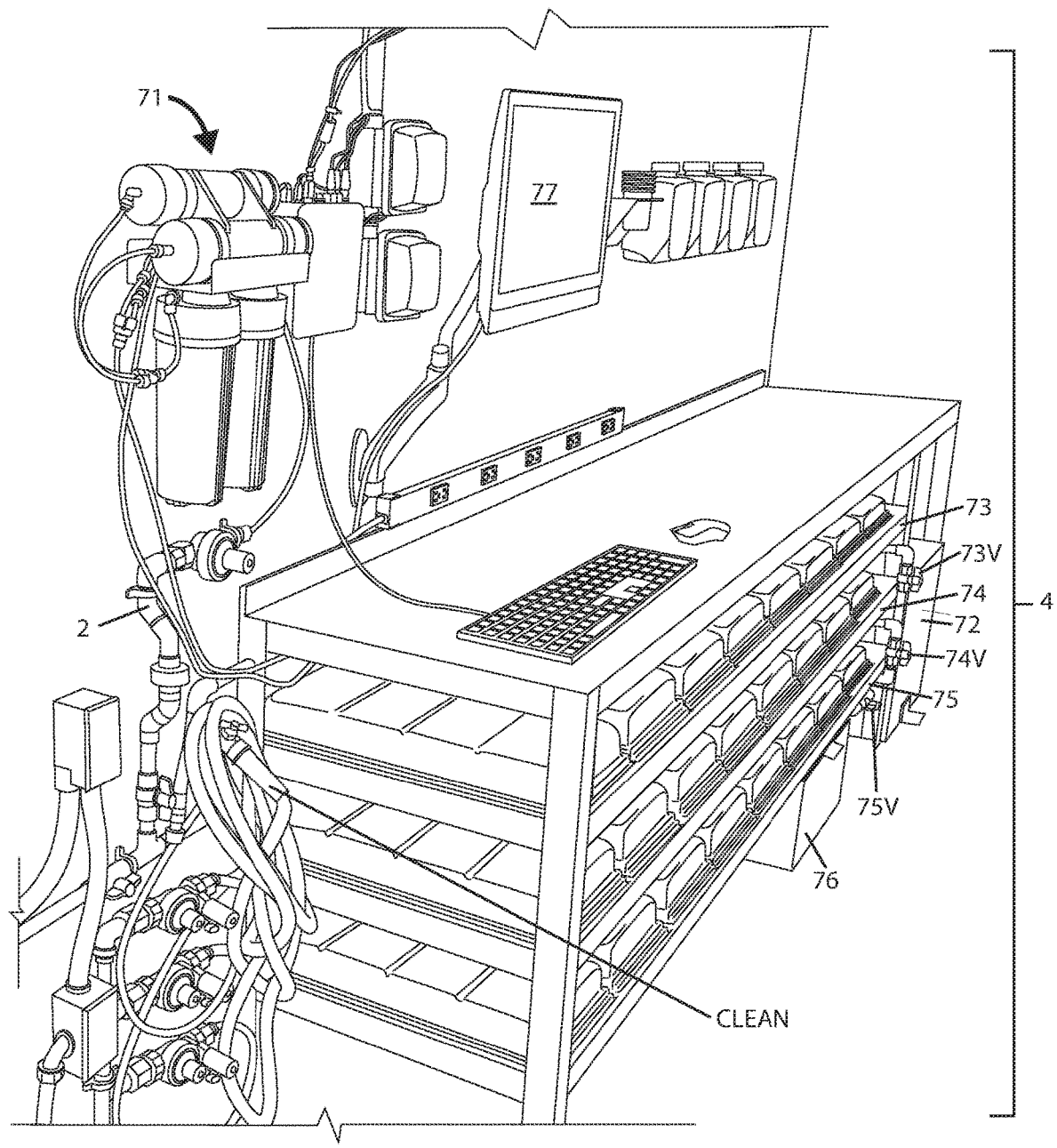
FIG. 7 is a rear perspective view of a seed grow station.

Referring next to FIG. 7 seed station 4 has city water fed via pipe 2. An R/O system 71 recirculates water in a reservoir 72. A small pump in reservoir 72 sends the nutrient water from reservoir 72 to upper tray 73 or middle tray 74 or lower tray 75 using valves 73V, 74V, and 75V. Excess nutrient water is caught in catch basin 76 and returned to the reservoir 72. A chemical balance system 14 controls the nutrient water as desired. A computer 77 can control ambient air temperature and humidity, valves 301, 302, 303 in FIG. 3, all timing cycles for nutrient flows and all lighting cycles.

Figure 8:
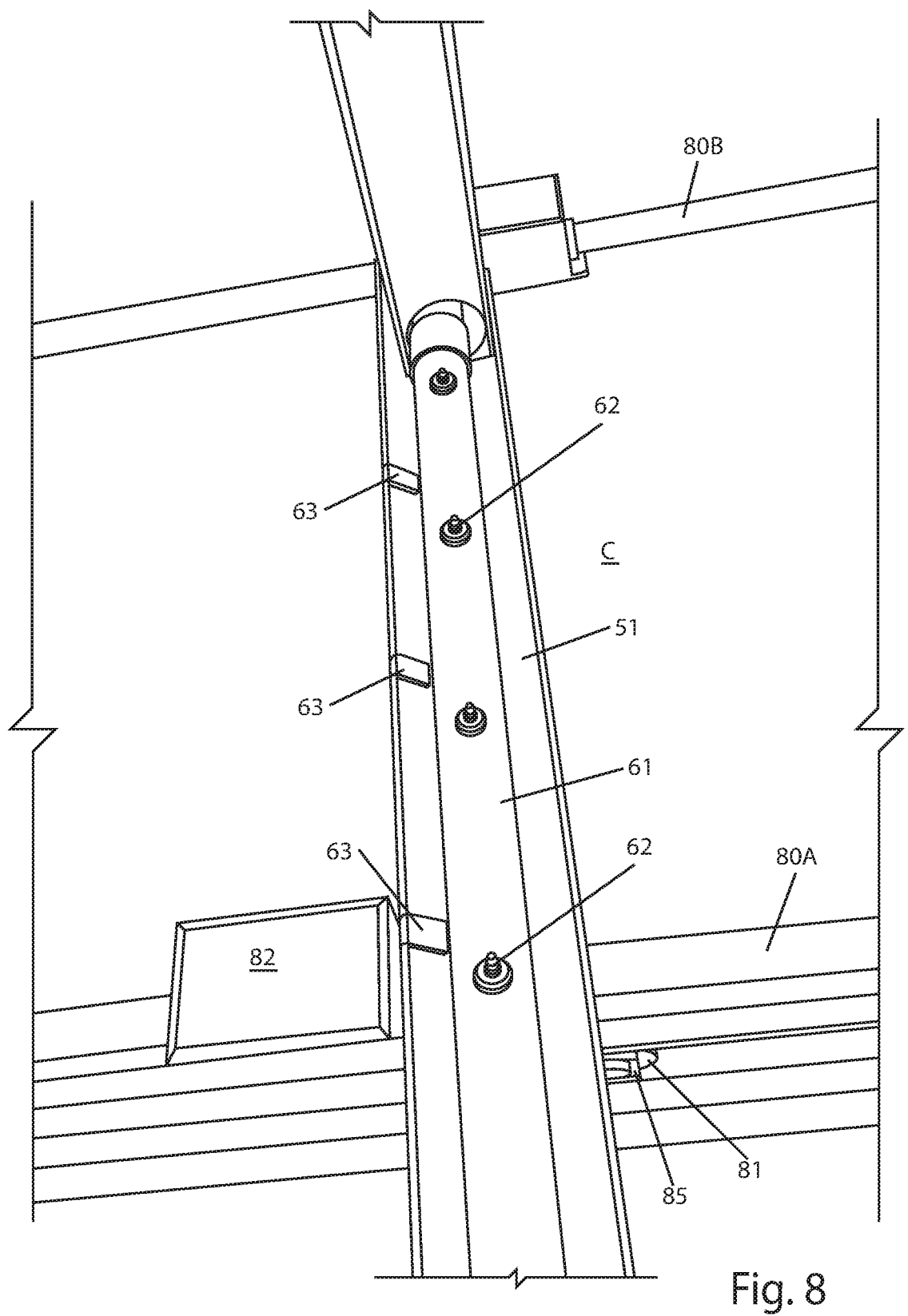
FIG. 8 is a bottom perspective view of the nutrient pipe in the grow wall.

Referring next to FIG. 8 two of the four transverse tracks 80A, 80B are shown. An electrical box 82 is shown. One wheel 81 of the tray 85 can be seen. The top brace 51 hangs from the trolley 85.

Figure 9:
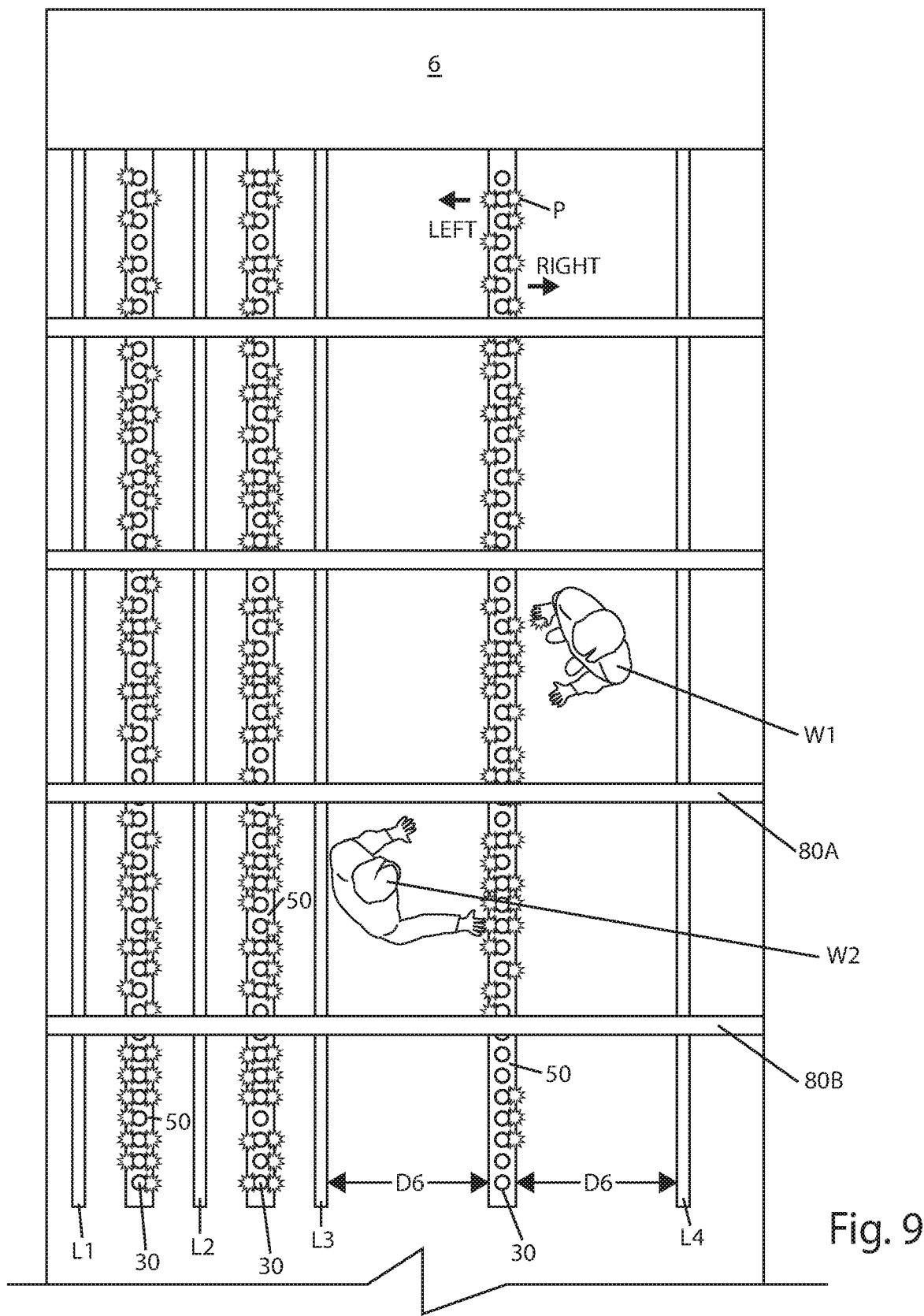
FIG. 9 is a top plan view of the container shown in FIG. 4 in use.

Referring next to FIG. 9 workers W1, W2 work in a wheelchair accessible space where D6=3.5'. All three grow walls 50 can be harvested by a worker in a wheelchair by sliding the grow walls 50 side to side as shown by arrows LEFT, RIGHT.

Figure 10:
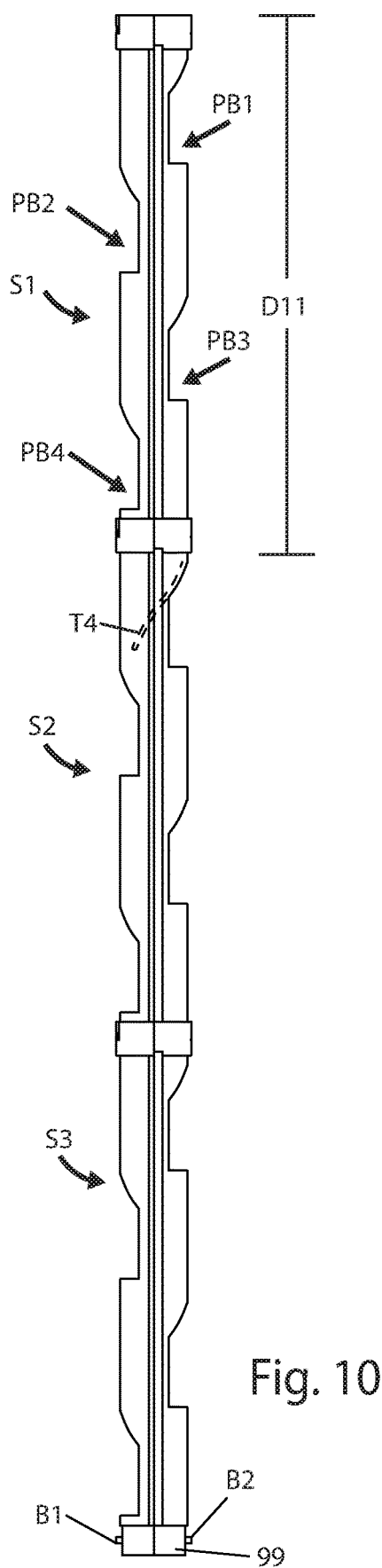
FIG. 10 is a side elevation view of the upper three tube segments of a vertical grow tube shown in FIG. 5A.
Figure 11:
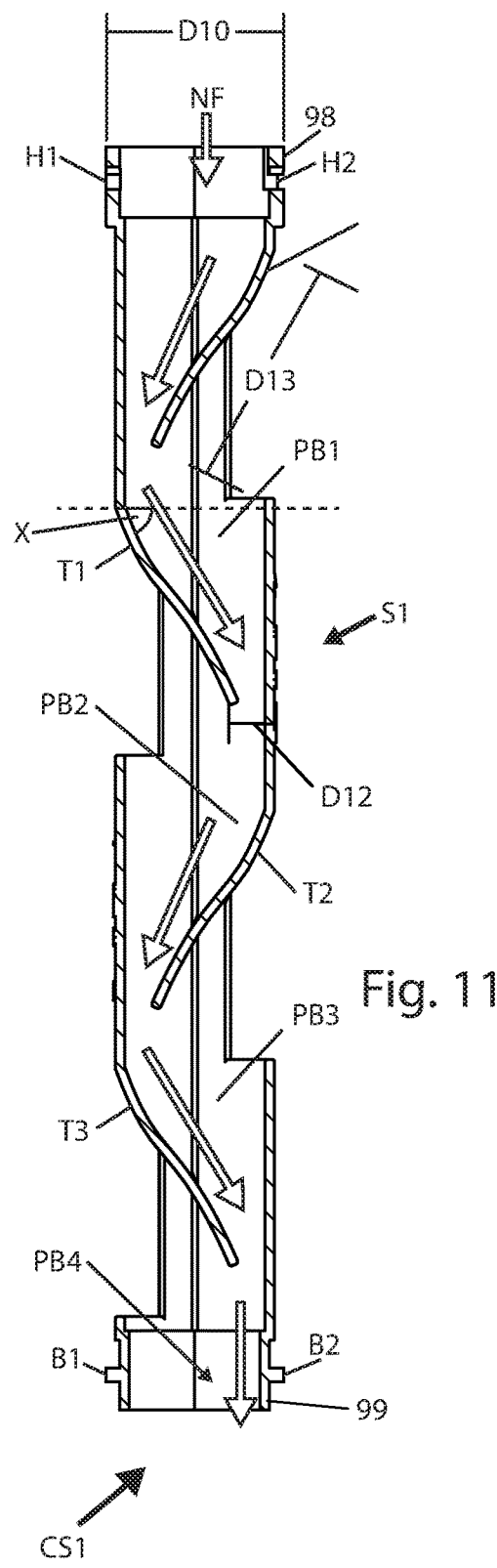
FIG. 11 is a longitudinal sectional view of the upper tube segment S1 shown in FIG. 10.

Referring to FIGS. 10, 11 identical grow tube segments S1, S2, and S3 from FIG. 5A are shown. Nominal dimensions of the plastic grow tube segments are outside diameter D10=2 inches, inside diameter ID=1 9/16 inches, and height D11=13.5 inches. Each top segment has hook holes H1, H2 for hooks 63 shown in FIG. 6. Each segment has three plant basins PB1, PB2, PB3. The root balls rest on the tongues T1, T2, T3. The arrows labeled nutrient flow NF show how the tongues T1-T3 divert the nutrient fluid from one side to the opposing side. The angle X is about 55° to about 65°. The distance D12 is about 0.5 inch, D13=_. Hook holes H1, H2 in top collar 98 can also function as joinder holes for base bosses B1, B2 in bottom collar 99. The plastic walls are about ⅛ inch thick.

Figure 12:
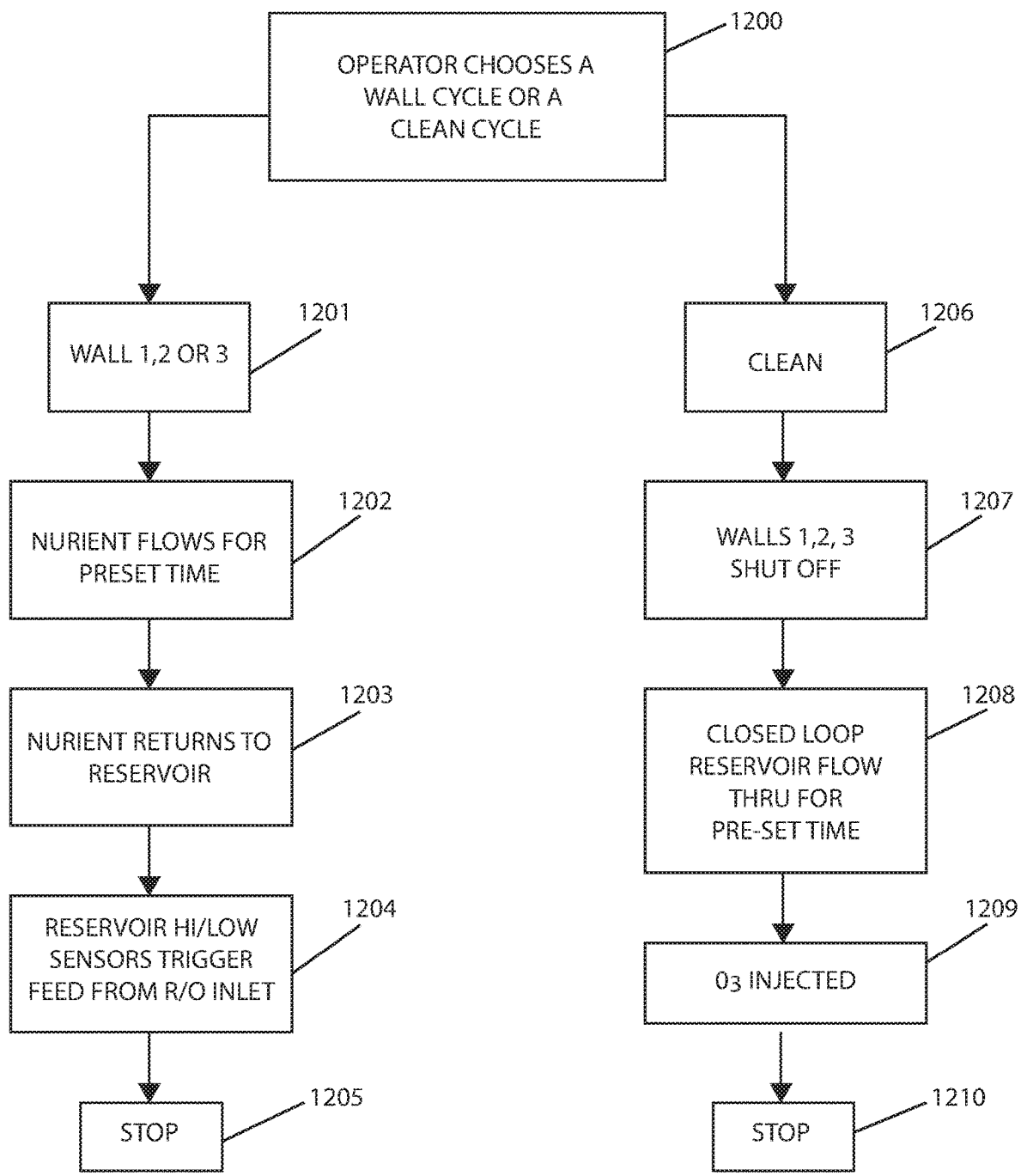
FIG. 12 is a flow chart of the nutrient flow logic.

Referring next to FIG. 12 a basic logic chart shows the operator choosing a grow wall nutrient watering cycle (valves 301-303 of FIG. 3) or a cleaning cycle (304 FIG. 3), box 1200. Box 1201 shows a selection, usually one at a time, of valves 301-303. Box 1202 shows the nutrient fluid from reservoir 6 flowing for a preset time. Box 1203 shows the nutrient return via gutters 53 and 11. Box 1204 shows the high Hi and low Lo sensors shown in FIG. 1 triggering a flow from R10 filter 5. Box 1205 ends the cycle which could be all controlled by computer 77 shown in FIG. 7.

If the clean cycle is chosen 1206, then valves 301-303 are closed 1207. The pre-set time for R/O filtering with $O_3$ injection is done in boxes 1208, 1209. Box 1210 ends the cycle.

Figure 13:
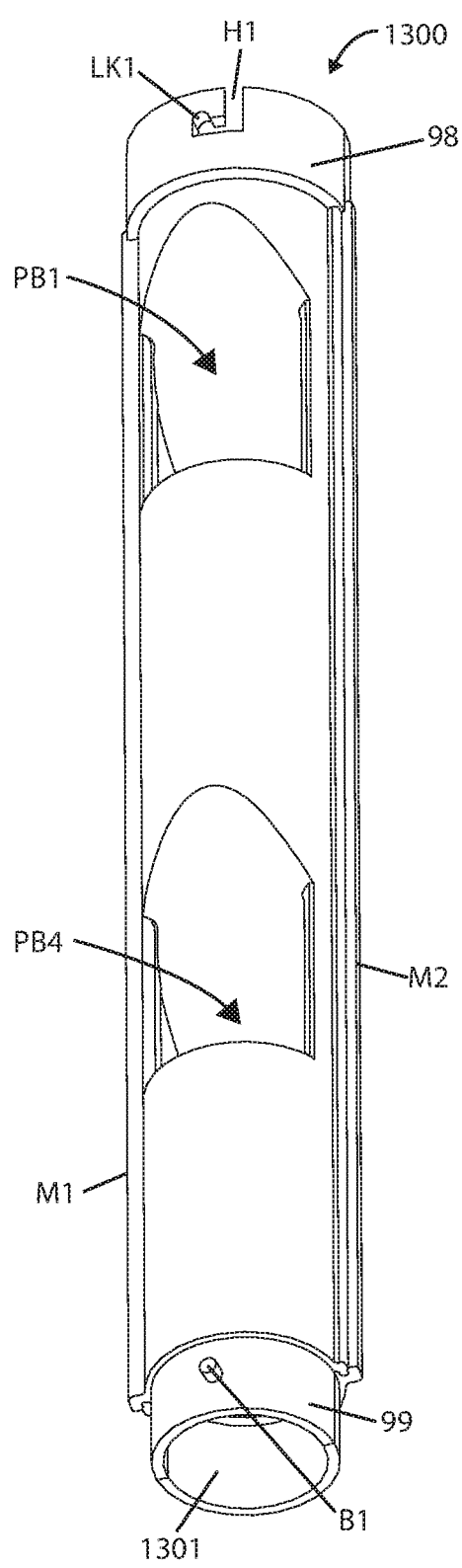
FIG. 13 is a bottom perspective view of tube segment S1 shown in FIG. 10.
Figure 14:
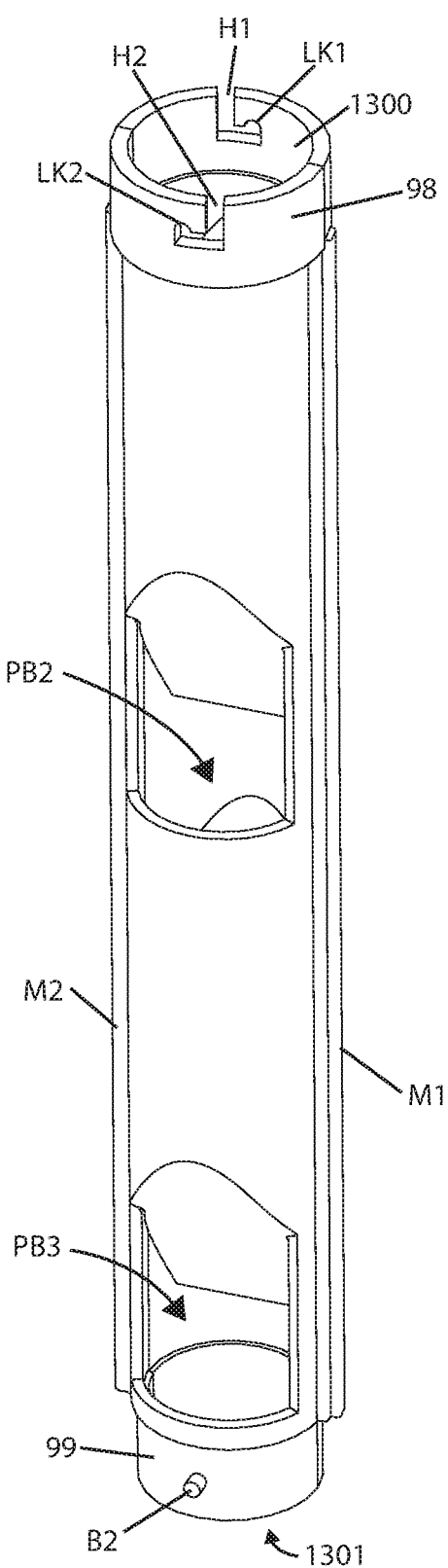
FIG. 14 is a front perspective view of tube segments S1 shown in FIG. 13.
Figure 15:
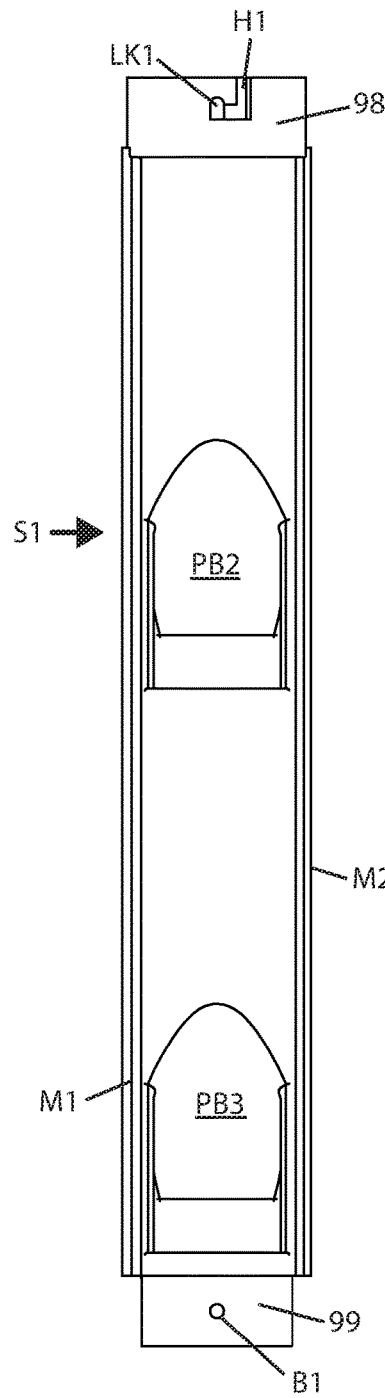
FIG. 15 is a front elevation view of tube segment S1 shown in FIG. 14.
Figure 16:
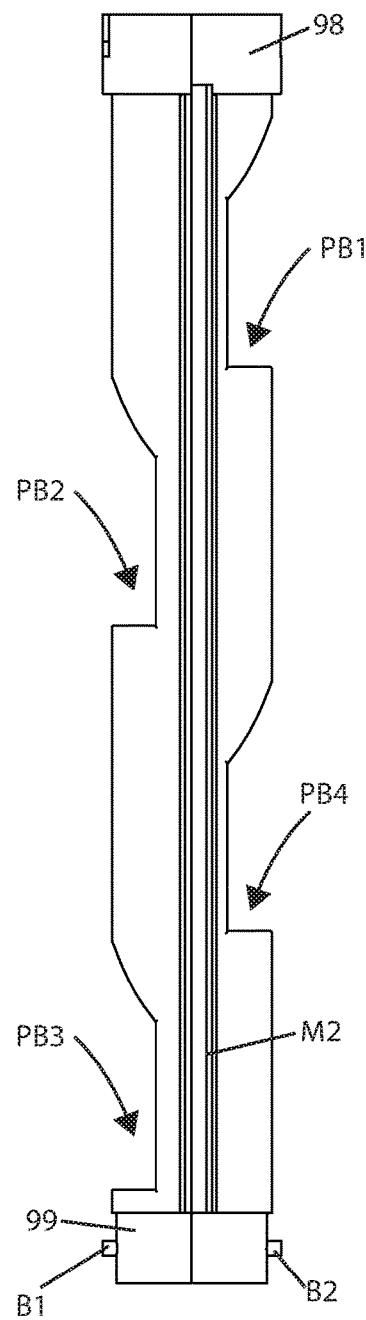
FIG. 16 is a right side elevation view of tube segment S1 shown in FIG. 15.
Figure 17:
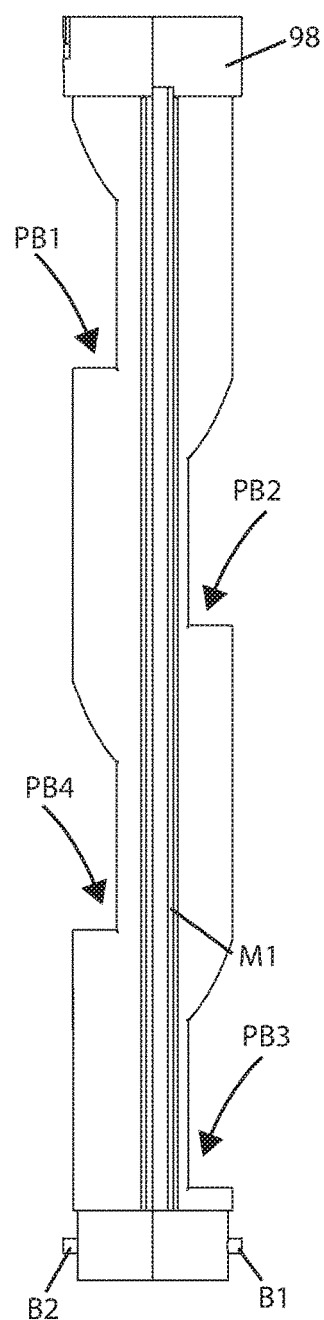
FIG. 17 is a left side elevation view of tube segment S1 shown in FIG. 16.
Figure 18:
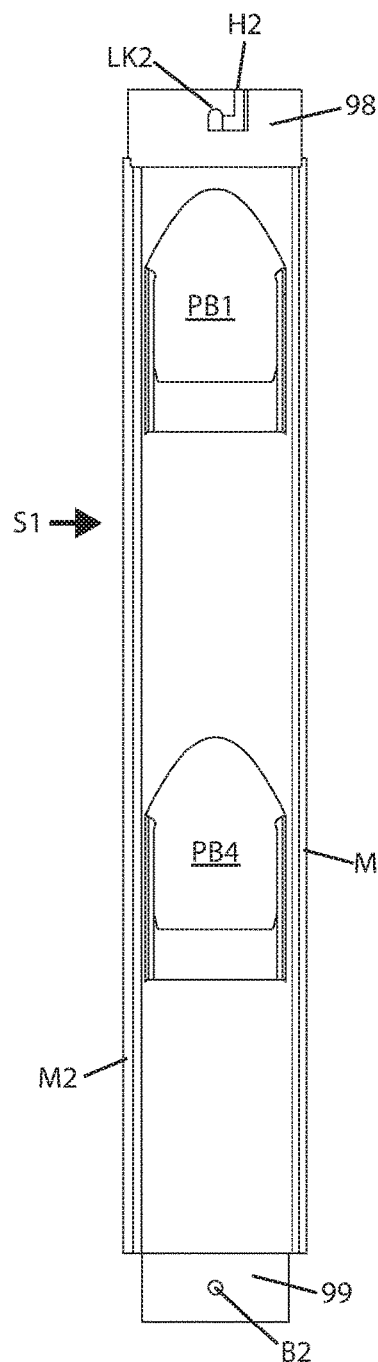
FIG. 18 is a rear elevation view of tube segment S1 shown in FIG. 17.

Referring next to FIGS. 13,14 the tube segment S1 is shown to have hole H1 having a twist lock groove LK1 to lock in place a boss B1 from an upper segment. Plant basin PB4 uses the tongue T4 of a lower segment as shown in FIG. 10.

Referring next to FIGS. 15-18 various views of a single tube segment S1 are shown.

Figure 19:
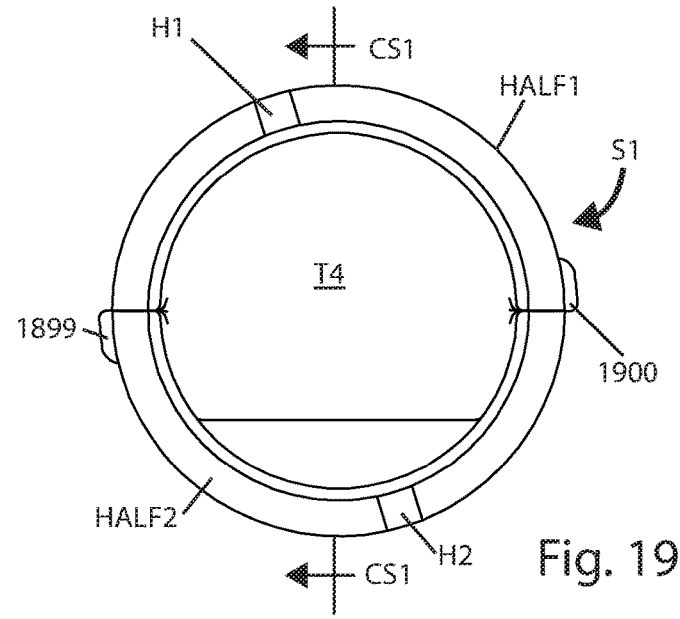
FIG. 19 is a top plan view of tube segment S1 shown in FIG. 18.
Figure 20:
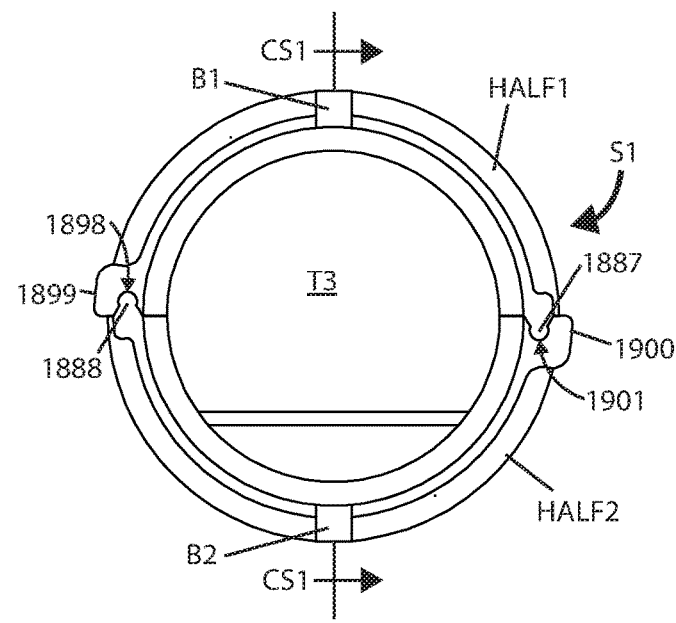
FIG. 20 is a bottom plan view of tube segment S1 shown in FIG. 18.

Referring next to FIGS. 19, 20 tube segment S1 is comprised of two halves that snap together labeled HALF1 and HALF2. HALF2 has ear 1900 with a slot 1901 to receive a boss 1887 from HALF1. HALF1 has ear 1899 with a slot 1898 to receive boss 1888 from HALF2.

Figure 21:
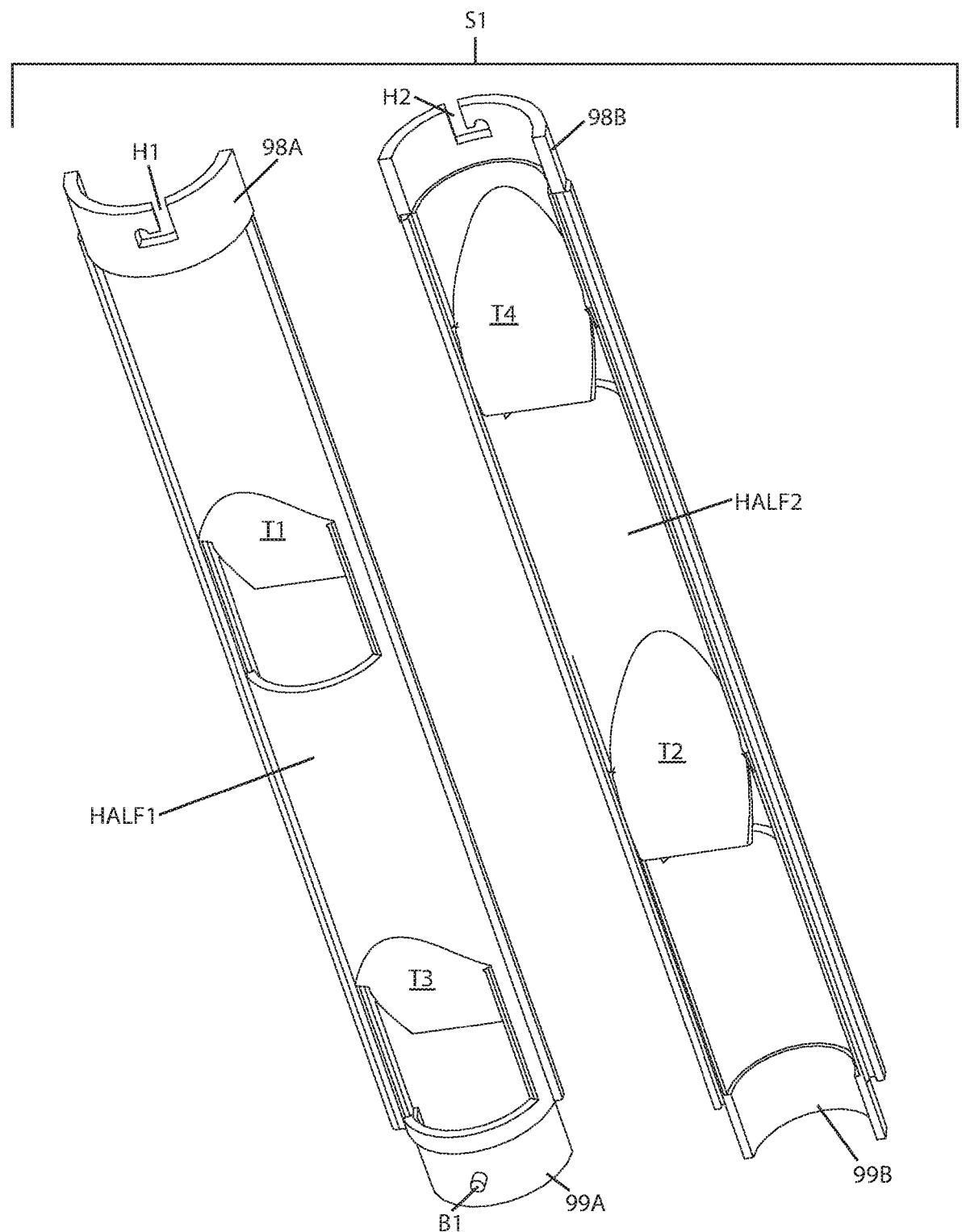
FIG. 21 is a front perspective exploded view of the tube segment S1 shown in FIG. 18.

Referring next to FIG. 21 the tube segment S1 is comprised of a first half HALF1 with upper collar halves 98A and 98B, and a second half HALF2 with lower collar halves 99A and 99B.

Figure 22:
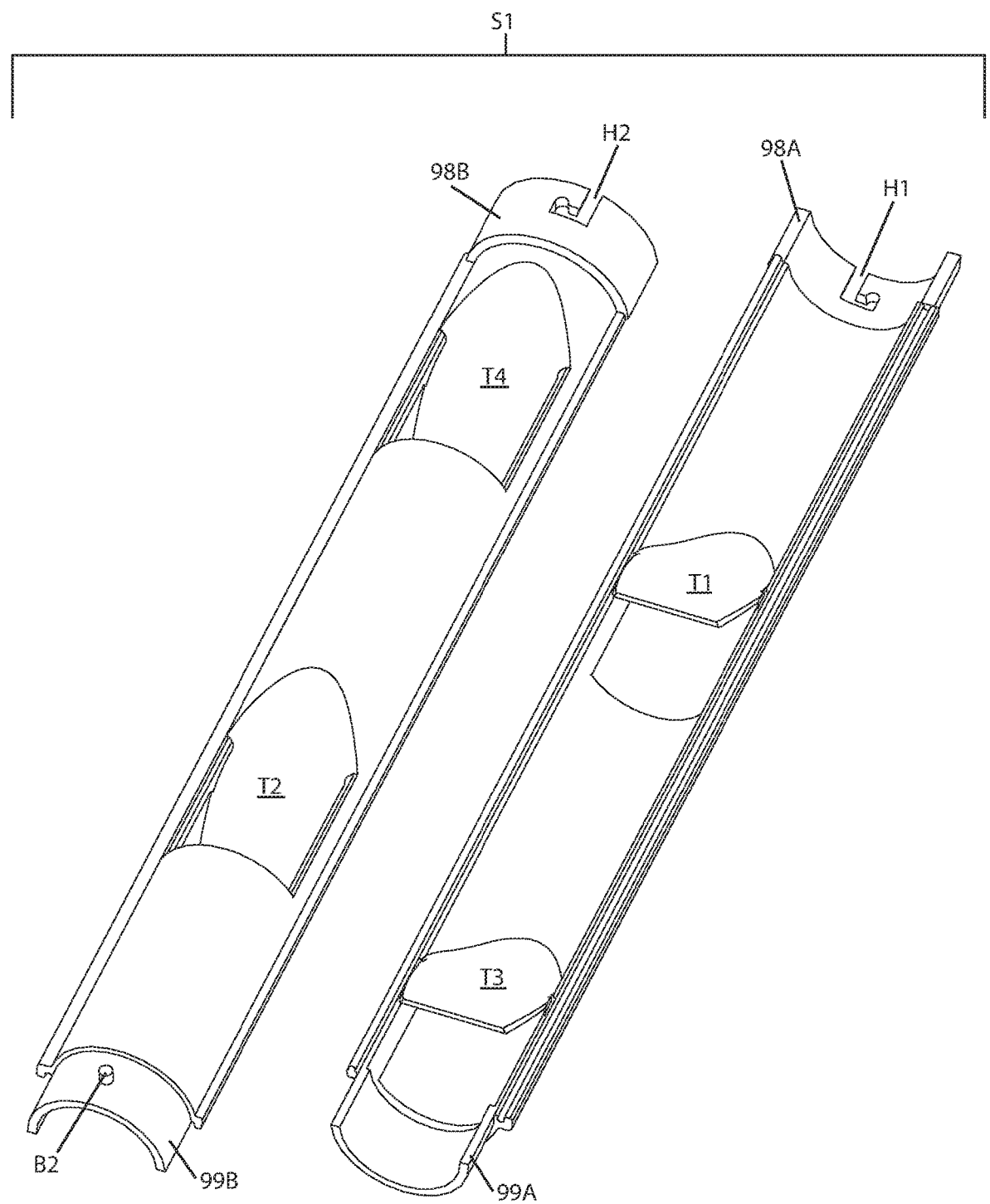
FIG. 22 is a rear perspective exploded view of the tube segment S1 shown in FIG. 21.

Referring next to FIG. 22 the rear exploded view is shown.

Referring next to FIG. 23 a side to side first and second half exploded front view of tube segment S1 is shown.

Referring next to FIG. 24 a side to side first and second half exploded side view of tube segment S1 is shown.

Figure 25:
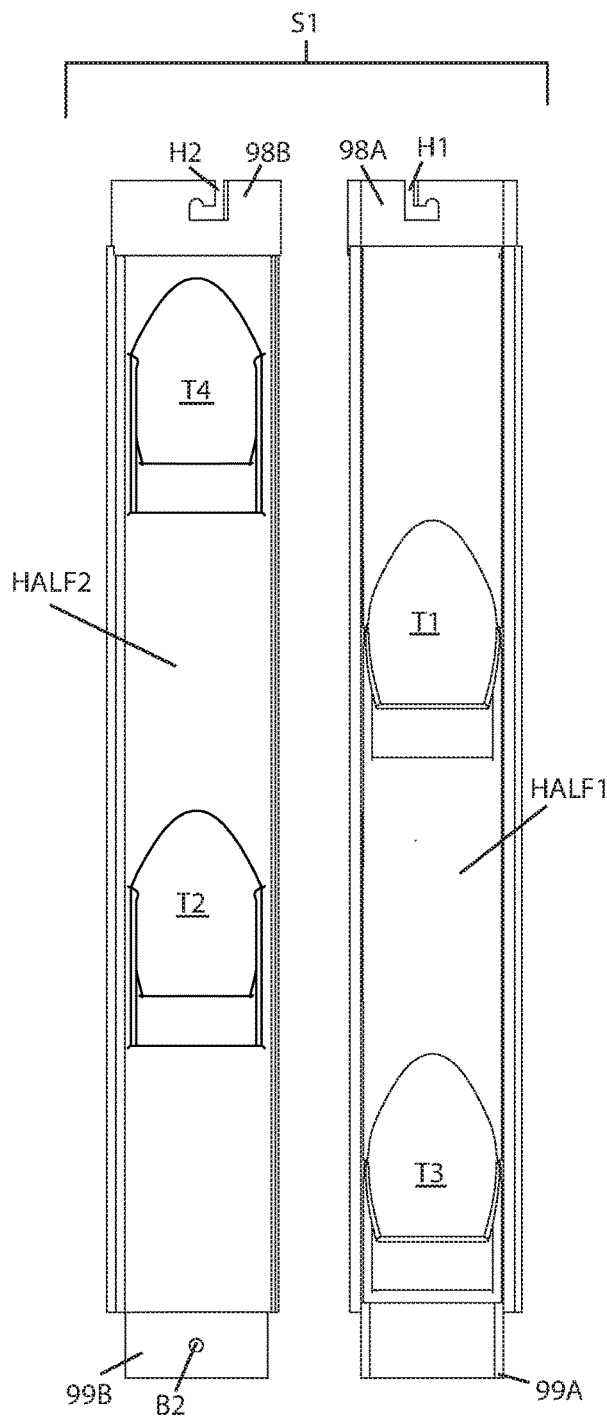
FIG. 25 is a rear elevation exploded view of the tube segment S1 shown in FIG. 24.

Referring next to FIG. 25 a rear elevation exploded view of pipe segment S1 is shown.

Figure 26:
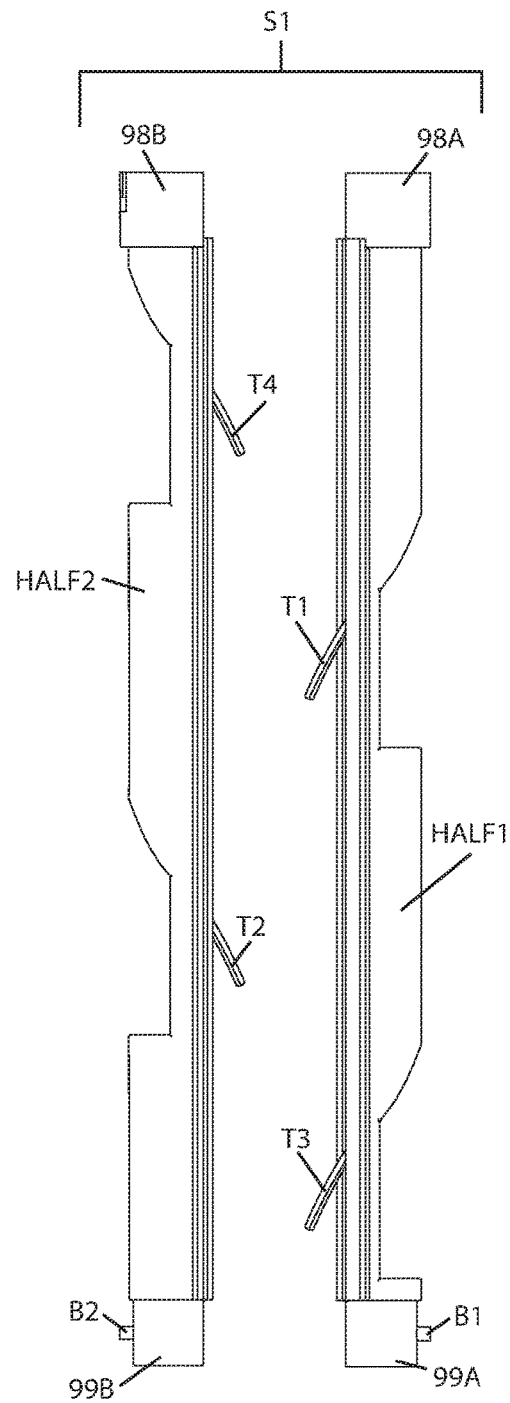
FIG. 26 is a left side elevation exploded view of the tube segment S1 shown in FIG. 25.

Referring next to FIG. 26 a left side elevation exploded view of pipe segment S1 is shown.

Figure 27:
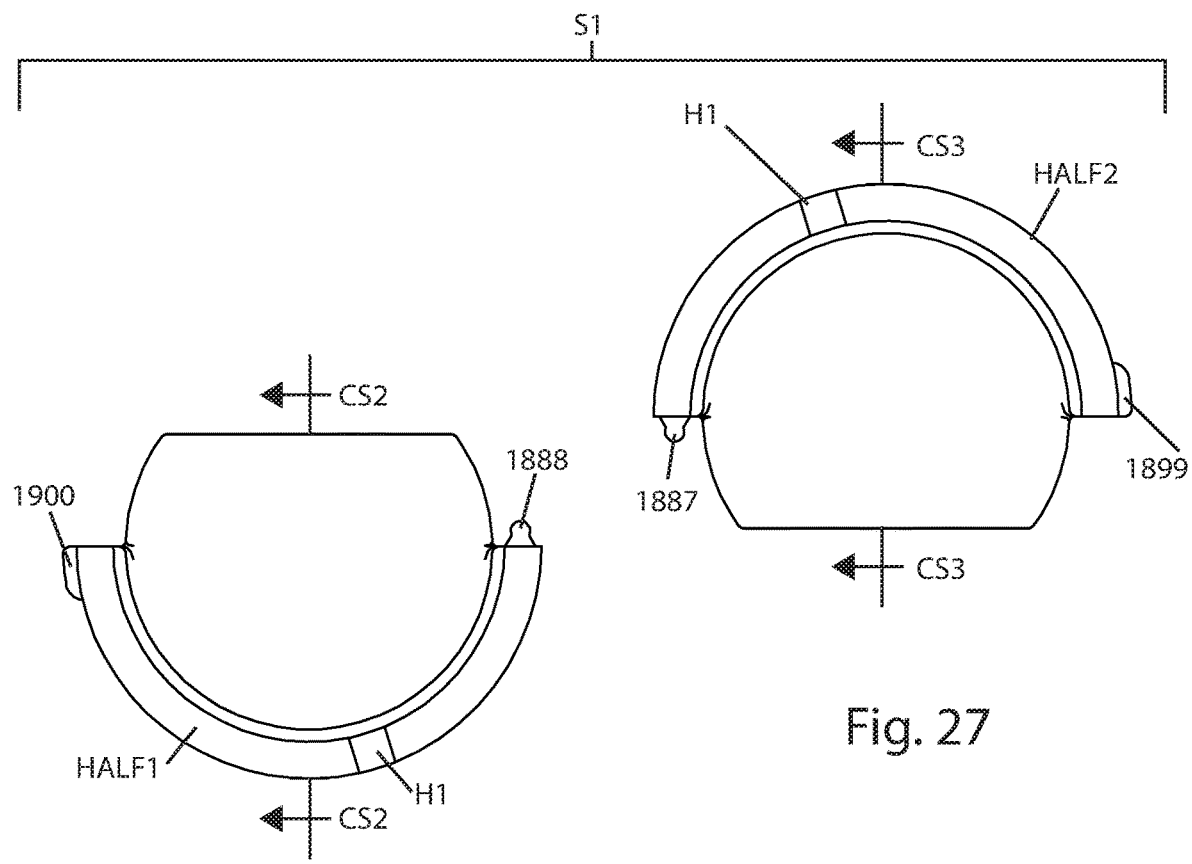
FIG. 27 is a top plan exploded view of tube segment S1 shown in FIG. 26.

Referring next to FIG. 27 the top plan view of halves HALF1 and HALF2 is shown.

Figure 28:
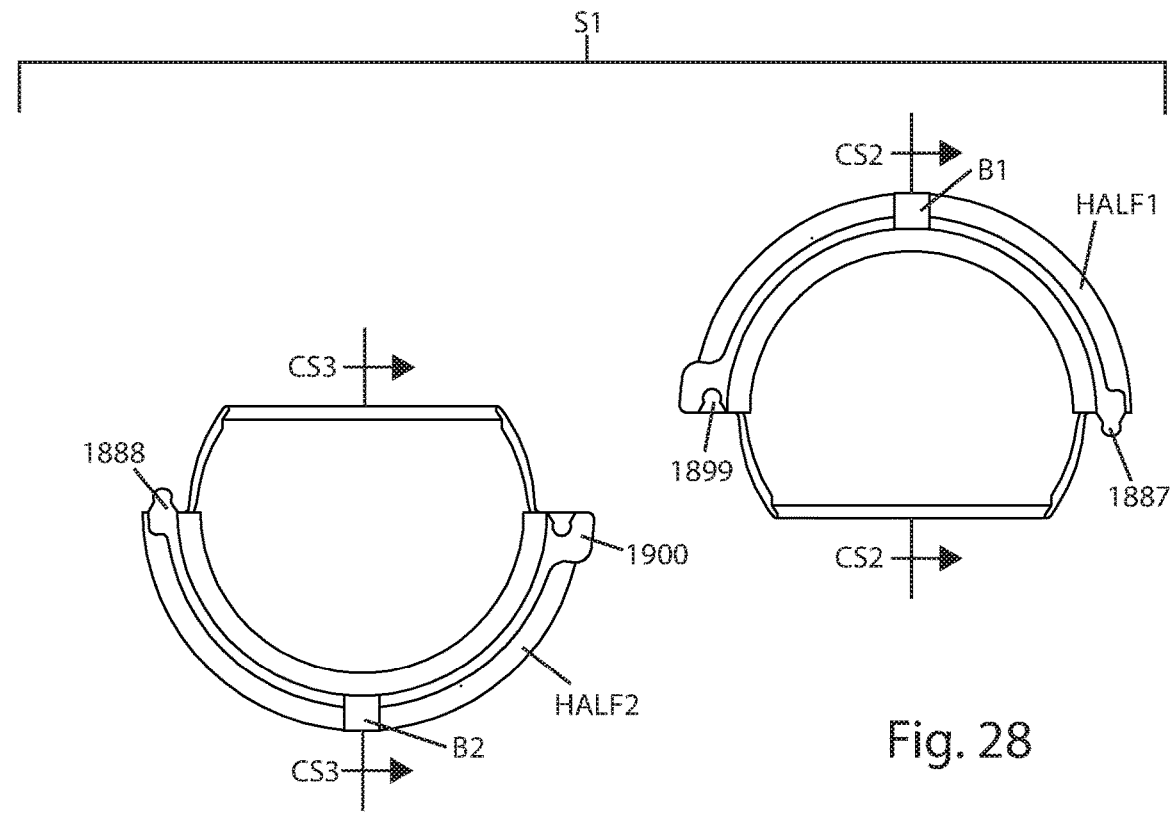
FIG. 28 is a bottom plan exploded view of tube segment S1 shown in FIG. 26.

Referring next to FIG. 28 the bottom plan view of halves HALF1 and HALF2 is shown.

Figure 29:
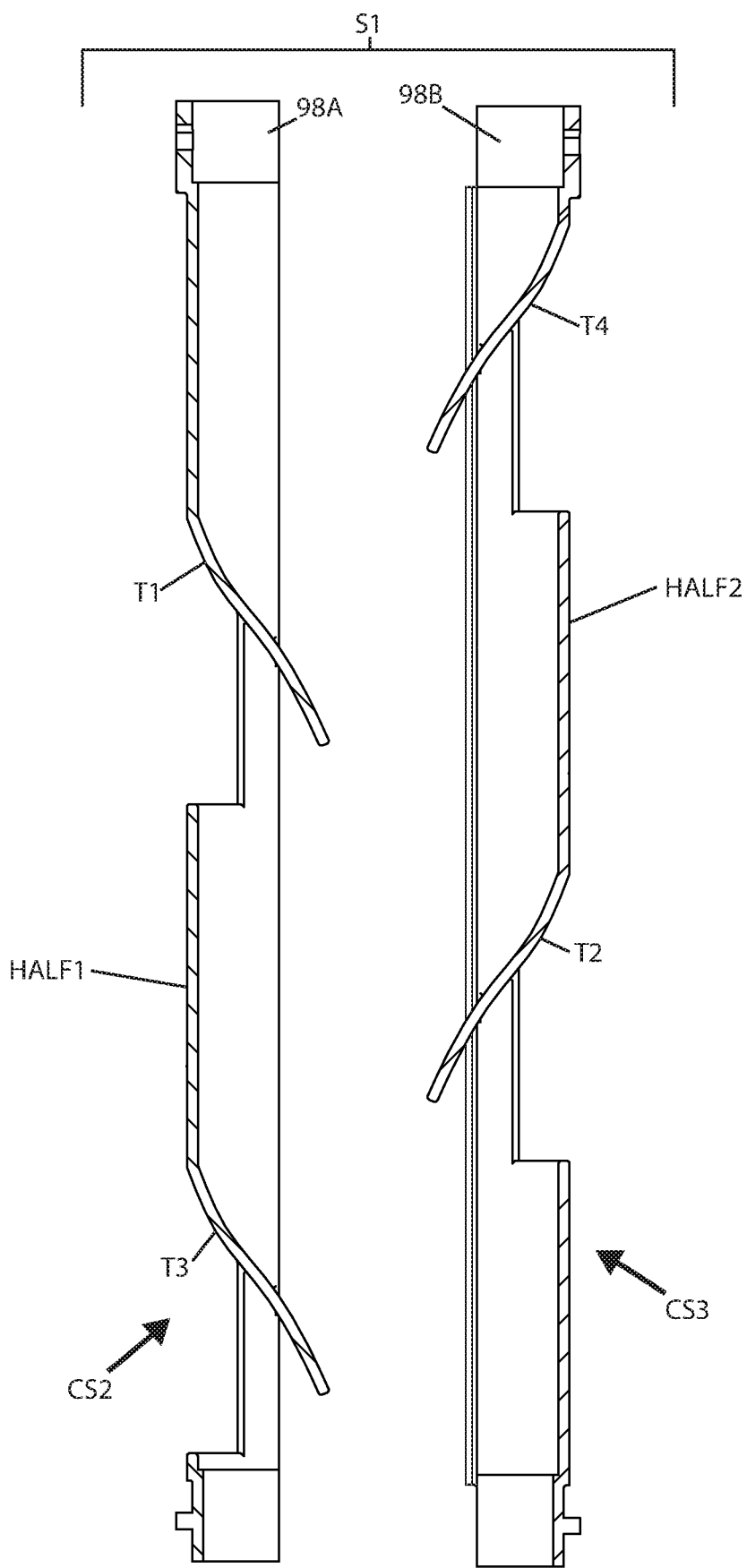
FIG. 29 is a longitudinal sectional exploded view of tube segment S1 shown in FIG. 26.

Referring next to FIG. 29 the halves HALF1 is shown on the left and HALF2 is shown on the right.

While a number of exemplifying features and embodiments have been discussed above, those of skill in the art will recognize certain modifications, permutations, additions and subcombinations thereof. No limitation with respect to the specific embodiments disclosed herein is intended or should be inferred.

The invention claimed is:

1. A hydroponic commercial plant cultivation system comprises:
   a grow enclosure;
   a nutrient delivery system;
   the nutrient delivery system comprises a nutrient solution reservoir, a nutrient solution supply piping, a nutrient solution collection and return piping;
   the nutrient delivery system, a plurality of lighting fixtures,
   a plurality of growing panels, and a grow system support structure being positioned within the grow enclosure;
   the plurality of growing panels and the plurality of lighting fixtures being slidably suspended by the grow system support structure via a side-to-side ceiling mounted rail support;
   each of the plurality of lighting fixtures being positioned adjacent to a specific growing panel from the plurality of growing panels;
   the nutrient solution supply piping being in fluid communication between the nutrient reservoir and the plurality of growing panels;
   the plurality of growing panels being in fluid communication between the nutrient solution supply piping and the nutrient solution collection and return piping;
   the nutrient solution collection and return piping further comprising an integral gutter at a base of each growing panel;
   wherein each integral gutter empties into a catch basin;
   a controller and monitoring system being communicably connected to at least one member selected from the group consisting of the nutrient delivery system, the plurality of lighting fixtures, the plurality of growing panels, and an environmental control system;
   the nutrient delivery system further comprises a feed from the catch basin;
   the environmental control system being integrated into the grow system enclosure; and
   each of the plurality of growing panels further comprising a plurality of vertical hanging grow tubes, each grow tube having a top entry port, a lower exit port emptying into the integral gutter, and a plurality of front and rear plant ports, each plant port in fluid communication with the top entry port.

2. The plant cultivation system of claim 1, wherein the grow enclosure further comprises a container having insulated walls, a flat, dry, non-skid floor, a city water inlet and an electric power inlet.

3. The plant cultivation system of claim 2, wherein the environmental control system further comprises an ambient air temperature control system, a fire alarm system and a motion detection system functioning to set off an alarm if the container is occupied and no motion occurs for a pre-set duration of time.

4. The plant cultivation system of claim 2, wherein the plurality of growing panels further comprise an adjustable working distance adjacent each side of each growing panel that accommodates a wheelchair.

5. The plant cultivation system of claim 4, wherein the container further comprises an end having a seed grow station with a plurality of grow shelves, and the grow station has an independent nutrient reservoir and nutrient delivery system.

6. The plant cultivation system of claim 1, wherein the plurality of lighting fixtures further comprise a primary white LED light strip and at least one frequency enhancer light strip selected to enhance a growth of a chosen plant.

7. The plant cultivation system of claim 6, wherein the frequency enhancer light strip has an independent ON/OFF control.

8. The plant cultivation system of claim 1, wherein the nutrient delivery system further comprises a pump to send the nutrient solution from the catch basin to the nutrient solution reservoir.

9. The plant cultivation system of claim 8, wherein the nutrient solution reservoir further comprises a pump fed manifold with a valve controlled pipe to each growing panel, and each pipe has a flexible section to connect to its respective growing panel.

10. The plant cultivation system of claim 9, wherein the manifold further comprises a valved pipe to an R/O filtration subsystem.

11. The plant cultivation system of claim 10, wherein an $O_3$ injector is integral to the R/O filtration subsystem, and an automatic shutoff control shuts off the valves to the pipes to the growing panels when the valve to the R/O filtration subsystem is open.

12. The plant cultivation system of claim 1, wherein each vertically hanging grow tube further comprises an inward facing baffle under each grow port, each baffle serving to support a plant and direct a nutrient solution flow downward, and each rear plant port is lower than an opposing front plant port, and each baffle directs the nutrient flow down and across a longitudinal axis of the vertical hanging grow tube, thereby watering each successive plant from the top to the bottom of the vertical hanging grow tube.

13. The plant cultivation system of claim 12, wherein each vertical hanging grow tube further comprises a modular set of detachable tube segments, wherein a top collar of each segment has a hole to receive a boss from a bottom of a joined segment, and said hole also functions as a mount to a hook in a top segment of the growing panel.

14. The plant cultivation system of claim 13, wherein each detachable tube segment further comprises a detachable pair of tube segment halves.

* * * * *